Patented July 18, 1933

1,918,403

UNITED STATES PATENT OFFICE

FREDERICK A. KORMANN, OF GLENDALE, AND JOHN A. MILLIFF, OF COMPTON, CALIFORNIA, ASSIGNORS TO BALDWIN VALE, OF SAN FRANCISCO, CALIFORNIA

PROCESSING LUBRICANTS

No Drawing.   Application filed December 15, 1928.  Serial No. 326,406.

This invention relates to improvements in processing lubricants.

The principal object of the invention is to produce a composition of matter containing nothing but lubricating ingredients.

Another object is to produce a product meeting all the trade requirements for a solid lubricant that may be substituted for the present acceptable forms of compression cup and gear greases in bearings and gear cases, but with improved lubricating qualities.

A further object is to produce this improved product by a novel process that may be practised with simple and easily available apparatus and of ingredients easily and economically obtainable. Other objects and advantages will appear as this description progresses.

In this specification the invention will be disclosed in one of its preferred forms, but we do not wish to be understood as limiting it to such form because it may be embodied in other forms and produced by modifications of the process. And it is also to be understood that in and by the claims following the description it is desired to cover the invention in whatsoever form it may be embodied.

The product is not to be confused with so-called compression greases depending upon inert ingredients or fillers to produce body.

The ingredients of the present composition, treated in accordance with this process produce a gelatinous mass the sum total of which is all lubricant for the purposes intended. There is no resort to "padding" such as soapy compounds, fibrous material or ash forming residuals.

In the following disclosure it will be noted that all the ingredients entering into the composition are recognized lubricants, either of mineral, vegetable or animal origin, resulting in a solid oil.

In the process of producing a solid oil in accordance with this invention an open steam jacketed kettle having a conventional stirring means therein is desirable.

Take, for example, a lubricating oil having a viscosity of 220 at 100° Saybolt universal. Add to this eight percent, by weight, of nitrated naphthalene and mix cold by stirring. The nitrated naphthalene is a granulated waxlike white powder and should be well distributed throughout the oil before heating.

After mixing raise the temperature of the mass to about 225° Fahrenheit. The first effect of the heat is to thin the body of the oil, after which the nitrated naphthalene gradually goes into solution.fl The mixture begins to lose its characteristic yellow white tone and to take on the color of the base oil. During the period that the nitrated naphthalene is dissolving and combining with the oil the mass shows a slight expansion of volume due to the liberated gases causing bubbles to form, although frothing is not noticeable, the level of the mass merely rises within the kettle, but the oil will show no increase in density or viscosity until the temperature is raised approximately twenty degrees more or to about 245° Fahrenheit.

From this point up to about 300° its density will noticeably increase and become extremely "ropy" or tenacious.

This temperature of 300° should be maintained for about thirty minutes.

At this point introduce about one tenth of one per cent of caoutchouc compound. This compound is made by dissolving gum "rubber" in toluol about as follows: Take 25 grammes of para gum crepe, which may be expressed as $C_{16}H_{10}(HO)$, in one liter of commercial toluol and allow to macerate a period of twenty-four hours at room temperature. This mass should be slightly opaque and entirely uniform, so that no particles having white casts or coagulations appear. The mass is gelatinous in texture.

At this point complete uniformity is noticeable. Five per cent of dimethylanaline added at this stage will act as an acceleration or nitrating medium, rendering stable the caoutchouc compound.

The addition of the caoutchouc to the oil at the point noted causes the composition to assume a characteristic clear transparent color tone and smooth texture. Without this addition the resultant compound tends to granulate and lack uniform consistency.

Then the solution should be subjected to cooling or chilling action by circulating it through coils by pumping. These coils should be submerged in circulating water or brine at a maximum temperature approximately 65° to 85° Fahrenheit. These temperatures will vary in accordance with the specifications of the solution under treatment and the desired result. After the addition of even this very small proportion of the caoutchouc compound, the reduction of power required to stir the stiffened mass is very noticeable. The caoutchouc compound very obviously reduces the molecular friction within the mass. Without this compound the lubricant tends to "granulate" and return to the nature of the nitrated naphthalene. This condition is not serious in compositions other than lubricants.

Without the addition of the minute quantity of dimethylanaline to the caoutchouc compound it tends to straticulate and show coagulated white casts.

After being subjected to the first cooling action and the addition of the caoutchouc compound as stated, the heating and endothermic process is repeated, by returning the total volume of treated oil back to the heated containers.

Therein it is again gradually brought back to the temperature of 300° Fahrenheit. After which it is again pumped under pressure, about 400 to 1200 pounds per square inch being necessary, according to the size of the pipes, through the cooling coils at about 65° to 85° Fahrenheit for the second cooling action as before.

After this reprocessing it is noticeable that the mass as a whole has become solid and stable. There is no separation, straticulation or variable consistency at any time following, even under heavy duty loads in commercial use.

The mass issues from the cooling coils as an oil with a gelatinous or jelly-like body with a high degree of inherent cohesion and a desirable adhesive tendency for metals.

It is a novel characteristic of the very heavy solid oil after this process, that if a quantity, say one pound, is dropped, it will split open with well defined fractures, as in the case of vegetable jellies and gelatine. This distinguishes it from any known "grease" commercially extant. It is further distinguished by the fact that if the finger is applied to the surface of the oil it will show stringy when the finger is withdrawn.

The original oil stock, for example 220 viscosity California lubricating distillate, may be expressed chemically about as follows in the process:

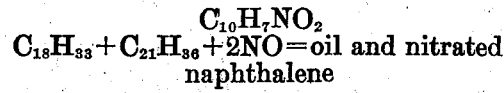

$$C_{10}H_7NO_2$$
$$C_{18}H_{33} + C_{21}H_{36} + 2NO = \text{oil and nitrated naphthalene}$$

These equations will show the chemical formula of the oil to be treated, plug what might be termed the "catalyzing" agent added, with its resultant chemical formula outline.

The desired consistency or solidity of any desired oil may be attained by this process by the skillful proportioning of the "catalyzing" agent. This agent is called "cataylizer" for want of a better term. The action may also be colloidal or coagulative.

Every degree of consistency can be produced by variations in the process and the ingredients disclosed above, from fluid oils, semi-solids, and up to solids of stiff jelly-like body, by those skilled in this art, without departing from the spirit of this invention.

The salient features are the use of nitrated naphthalene, the caoutchouc compound and the reprocessing of hydrocarbon oils containing the same. The grades of oil, the temperatures and the various proportions set forth herein are suggestive and not intended to describe the limits nor define the scope of the invention.

Lubricating oils susceptible of treatment by this process to form the desired solid oils, include among the animal derivatives, lard oil, sperm oil, and other fat oils. Among available vegetable derivatives are castor bean oil, rape and other seed oils, and all the petroleum and other mineral oils now commercially available.

In producing solid oil according to this invention, to meet the range of demand for compression greases and gear compounds commercially extant, requires the use of the catalyzing agent nitrated naphthalene in proportion of about ten percent by weight for the heavier bodies, down to one and one-half per cent for the semi-solids and fluids.

Some of the hydro-carbons treated have ranged as low as what is known in the refining industry as residual ends and as high as kerosene.

The apparent effect of the nitrated naphthalene reaction is to promote molecular cohesion in any mixture of known lubricants to which it may be applied.

The homogeneous nature of the lubricant produced by this invention and its jelly-like resilient body, causes it to cling tenaciously to all bearing surfaces with which it comes in contact.

This composition is highly transparent. It is possible to read ordinary print through several inches of it, as characteristic of the base oil entering into its composition.

The apparatus necessary in the practice of this process is extremely simple. The oil may be mixed and heated in ordinary open kettles, and pumped through cooling pipes for the endothermic reaction. Such apparatus is to be found in every petroleum distillery and it is deemed unnecessary to describe it in detail or diagram it.

Pure para caoutchouc is preferred as the gum content, but there are other similar saps and gums that will give results in proportion to their quality and suitability for the purpose.

The value of this process has been stressed in the production of lubricants, that being the major object, but it is useful also in producing solid oils for toilet, medicinal and other purposes.

The process reduces capillarity to the point where the lubricant will not spread or creep out of bearings, bottles or other containers. This is true up to temperatures as high as 350° Fahrenheit. A quantity applied to the outside of a dry hot steam jacket, did not run, drip, froth, smoke or lose its lubricating body. In "hot boxes" at ordinary temperatures, its body slightly increases, at high temperatures it still continued to produce maximum lubrication. In one instance the temperature of a bearing was reduced 34° from near 200° by the substitution of this lubricant.

Having thus described this invention, what is claimed and desired to be secured by Letters Patent is:

1. The process of forming a solid lubricant consisting of mixing an oil with nitrated naphthalene; heating the mixture until the nitrated naphthalene goes into solution; then introducing a compound of caoutchouc macerated in toluol; then subjecting the mass to endothermic reaction; then reheating the mass and again subjecting the mass to cooling action.

2. The process of forming a solid lubricant consisting of mixing an oil with nitrated naphthalene; then raising the temperature of the mixture to about 225° to 300° F.; then introducing a gum compound composed of caoutchouc macerated in toluol and dimethylanaline; then raising the temperature of the mass until the mixture combines; then subjecting the mass to endothermic reaction; then reheating the mass and again subjecting it to cooling action.

3. The process of forming a solid lubricant consisting of mixing an oil with about eight per cent of nitrated naphthalene by weight; then heating the mixture to about 225° to 300° F.; then introducing about one-tenth of one per cent of a caoutchouc compound composed of twenty-five grammes of caoutchouc macerated in one liter of toluol and a minute quantity of dimethylanaline; then raising the temperature of the mass and sustaining it until it combines; then subjecting the mass to endothermic reaction; then reheating the mass and again subjecting it to cooling action.

FREDERICK A. KORMANN.
JOHN A. MILLIFF.